US007796505B2

(12) United States Patent
Olsson et al.

(10) Patent No.: US 7,796,505 B2
(45) Date of Patent: Sep. 14, 2010

(54) METHOD FOR PROCESSING TRAFFIC DATA IN A WIRELESS COMMUNICATIONS SYSTEM

(75) Inventors: Patrik Olsson, Birmingham (GB); Gideon Roberts, Stone (GB); Andrew Farnsworth, Bromsgrove (GB)

(73) Assignee: M-Stack Limited, Birmingham (GB)

( * ) Notice: Subject to any disclaimer, the term of this patent is extended or adjusted under 35 U.S.C. 154(b) by 1368 days.

(21) Appl. No.: 11/043,434

(22) Filed: Jan. 26, 2005

(65) Prior Publication Data

US 2006/0164981 A1    Jul. 27, 2006

(51) Int. Cl.
*G01R 31/08* (2006.01)
(52) U.S. Cl. .................. 370/229; 370/331; 370/338
(58) Field of Classification Search ............ 370/331, 370/229, 338
See application file for complete search history.

(56) References Cited

U.S. PATENT DOCUMENTS

| 7,203,514 | B2 * | 4/2007 | Park et al. ............. 455/552.1 |
| 2002/0037000 | A1 | 3/2002 | Park |
| 2003/0095519 | A1 * | 5/2003 | Kuo et al. ............... 370/338 |
| 2004/0208160 | A1 * | 10/2004 | Petrovic et al. ........... 370/350 |
| 2005/0111410 | A1 * | 5/2005 | Bazar ...................... 370/331 |

OTHER PUBLICATIONS

Universal Mobile Telecommuications System (UMTS); Medium Access Control (MAC) protocol specification (3GPP TS 25.321 version 6.2.0 Release 6); Jun. 2004; URL:<www.3gpp.org>.

* cited by examiner

Primary Examiner—Daniel J Ryman
Assistant Examiner—John Blanton

(57) ABSTRACT

The present invention concerns a method of processing traffic data in Layer 2 of a wireless communications system, whereby the MAC layer is arranged, after receipt of a traffic data volume report from the RLC layer, to process said data volume report and to then issue an acknowledgement message to the RLC layer. The method ensures that the RLC and MAC layers are synchronized with respect to traffic data processing. The MAC layer may be arranged to issue an acknowledgement to the RLC layer only where it determines from processing a data volume report that the RLC layer is not permitted to transmit data in a next or subsequent corresponding TTI. The present invention also concerns a process for data discard in a Radio Link Control (RLC) layer of a Wideband Code Division Multiple Access (WCDMA) wireless communications system such as a Universal Mobile Telecommunications System (UMTS). The process involves, responsive to the
triggering of a data discard operation, determining whether the RLC layer is permitted to transmit data. Where it is determined that the RLC layer is not permitted to transmit data in a next or subsequent TTI, the method includes the step of informing the RLC layer that data is not required.

30 Claims, 7 Drawing Sheets

METHOD FOR PROCESSING TRAFFIC DATA IN A WIRELESS COMMUNICATIONS SYSTEM

FIELD OF THE INVENTION

The present invention comprises an improved method for processing traffic data at Layer 2 in a wireless communications system and particularly, but not exclusively to an improved process for data discard in a Radio Link Control (RLC) layer of a Wideband Code Division Multiple Access (WCDMA) wireless communications system such as a Universal Mobile Telecommunications System (UMTS).

BACKGROUND TO THE INVENTION.

The UMTS network architecture consists of three components, namely the Core Network, the UMTS Terrestrial Radio Access Network (UTRAN) and the User Equipment (UE). In UTRAN, three protocol layers are specified. These comprise: Layer 1, the physical layer which uses WCDMA on the radio link interface; Layer 2, the link layer containing Medium Access Control (MAC), Radio Link Control (RLC) and Packet Data Convergence Protocol (PDCP) sub-layers; and Layer 3, the Radio Resource Control (RRC) which exists in the control plane only. These layers are mirrored in the UE at the other end of the radio link with the UTRAN.

The physical layer transforms radio frames between the Node B and the UE. One radio frame, which may include several RLC Packet Data Units (PDUs), is sent during each Transmission Time Interval (TTI). Through an attribute of the transport format, the MAC layer decides by means of a Transport Format Combination (TFC) selection process which PDUs to send in each TTI. Three types of service are provided by the RLC protocol comprising Transparent Mode (TM), Unacknowledged Mode (UM) and Acknowledged Mode (AM). The RRC is responsible for the transport format and also determines the transmission mode of the RLC.

The RLC performs segmentation/reassembly of RLC Service Data Units (SDUs), into/from smaller RLC PDUs. The three RLC operations needed to make flow control more efficient are a polling mechanism, a status transmission mechanism and a SDU discard mechanism.

The SDU discard function allows the sender (UTRAN or UE) to discard RLC SDUs when the transmission of the RLC SDUs does not succeed for a period of time or for a number of transmissions. The SDU discard function therefore helps avoid buffer overflow which might result in following RLC SDUs being discarded as a result of the buffer being full. There are several alternative operation modes of the RLC data discard function. Upper layers control which operation mode is used for each RLC entity. The data discard operation modes include, for example, "timer based discard with explicit signalling" applicable to AM transmission only and "timer based discard without explicit signalling" applicable to TM and UM transmission. SDU discard function is always configured for AM transmission, but may not always be configured for TM and UM transmission.

SDUs buffered in the RLC layer which are to be discarded should not, however, be discarded where the MAC layer has started its TFC selection. When TFC selection has started, the RLC layer delays discarding the data until the end of the next TTI. The problem encountered with this process is that the RLC layer is not made aware of when the MAC layer has started its TFC selection. The RLC layer will receive an indication from the MAC layer when a TFC selection has ended and the RLC layer is required to provide the MAC layer with data for the corresponding TTI. However, when no data from the RLC layer is to be transmitted in that corresponding TTI, the MAC layer does not send any indication of end of TFC selection to the RLC layer. This may occur for a number of consecutive TTIs and thus, since the RLC layer does not receive any indication from the MAC layer of end of TFC selection for the series of TTIs, the RLC layer cannot discard the data during that time. This impacts the Quality of Service (QoS) offered by the RLC layer as data will not be discarded as specified. Also, new data being received in the RLC layer from upper layers may be discarded as a result of RLC buffer overflow whilst the RLC layer awaits an indication from the MAC layer of end of TFC selection.

OBJECT OF THE INVENTION

It is an object of the invention to mitigate and/or obviate problems associated with the existing arrangement as described above.

It is a further object of the invention to minimise the time between the RLC layer triggering a data discard operation and actually performing the discard operation.

SUMMARY OF THE INVENTION

In a first main aspect, the present invention provides a method of processing traffic data in a medium access control (MAC) layer of a wireless communications system, the method comprising the steps of: receiving a traffic data volume report at the MAC layer; processing said data volume report; and following processing of said report, issuing an acknowledgement message to the entity from which the report was received. The entity issuing the data volume report comprises a radio link control (RLC) layer of the wireless communications system.

Preferably, the MAC layer is arranged to issue an acknowledgement message to the entity from which the report was received only where it is determined from the data volume report that said entity is not permitted to transmit traffic data to the MAC layer in a next or subsequent corresponding transmission time interval (TTI).

In a second main aspect, the present invention provides a method of discarding data in a radio link control (RLC) layer of a wireless communications system, comprising the steps of: triggering a data discard operation in a first transmission time interval (TTI); determining for a next or a subsequent TTI whether the RLC layer is permitted to transmit data; and where the determination is made that the RLC layer is not permitted to transmit data in the next or subsequent TTI, the method includes the steps of: informing the RLC layer that data is not required; and performing the data discard operation.

Consequently, the present invention mitigates the problem associated with the current SDU discard process whereby the data discard operation may, in effect, be suspended for a series of consecutive TTIs.

Preferably, the RLC layer is informed that data is not required for the next or subsequent TTI after completion of a current Transport Format Combination (TFC) selection process.

Preferably, the data discard operation is performed immediately upon the RLC layer being informed that data is not required.

Advantageously, this reduces the time delay between a data discard operation being triggered and being performed and reduces the likelihood of following SDUs from upper layers being discarded through RLC buffer overflow.

The method may include arranging for a Medium Access Control (MAC) layer to inform the RLC layer that data is not required. The indication that data is not required may comprises an indication of the start of the next TTI.

Preferably, the triggering of the data discard operation in the first TTI causes said RLC layer to issue a request to said MAC layer in said first TTI for the MAC layer to inform the RLC layer that data is not required for the next or subsequent TTI.

The request issued by said RLC layer in said first TTI may be contained in a data volume report.

In a third main aspect, the present invention provides a radio network controller (RNC) for a wireless communications network, comprising: means for triggering a data discard operation in a first transmission time interval (TTI); means for determining for a next or a subsequent TTI whether the RLC layer is permitted to transmit data; means responsive to said determining means and being arranged where said determining means determines that the RLC layer is not permitted to transmit data in the next or subsequent TTI to inform the RLC layer that data is not required; and means for performing the data discard operation.

In a fourth main aspect, the present invention provides a user equipment (UE) for a wireless communications network, comprising: means for triggering a data discard operation in a first transmission time interval (TTI); means for determining for a next or a subsequent TTI whether the RLC layer is permitted to transmit data; means responsive to said determining means and being arranged where said determining means determines that the RLC layer is not permitted to transmit data in the next or subsequent TTI to inform the RLC layer that data is not required; and means for performing the data discard operation.

The user equipment may comprise a mobile communications device.

In a fifth main aspect, the present invention provides a computer readable medium comprising code means executable on a processor of the radio network controller in accordance with the third main aspect for implementing the methods of the first and second main aspects.

In a sixth main aspect, the present invention provides a computer readable medium comprising code means executable on a processor of the user equipment of the fourth main aspect for implementing the methods of the first and second main aspects.

Further aspects and features of the present invention will be apparent from the appended claims.

BRIEF DESCRIPTION OF THE DRAWINGS

A description of the present invention will follow with reference to the accompanying drawings, of which.

DETAILED DESCRIPTION OF A PREFERRED EMBODIMENT

The foregoing and further features of the present invention will be more readily understood from a description of a preferred embodiment, by way of example thereof, with reference to the accompanying figures.

The so-called third generation mobile communications system is presently evolving. This is a next generation global mobile communications system that is generally based on the core network technology of the existing Global System for Mobile Communications (GSM). Various telecommunications standards bodies and telecommunications equipment vendors from around the world have agreed to collaborate on what is known as the Third Generation Partnership Project (3GPP). The 3GPP encompasses a number of research fields including the Universal Mobile Telecommunications System (UMTS) Terrestrial Radio Access Network (UTRAN). UMTS is the European form of the third generation mobile communications system.

The following description of the UTRAN with reference to FIGS. 1 to 5 is provided as background to the present invention and by way of explanation thereof.

Figure 1:
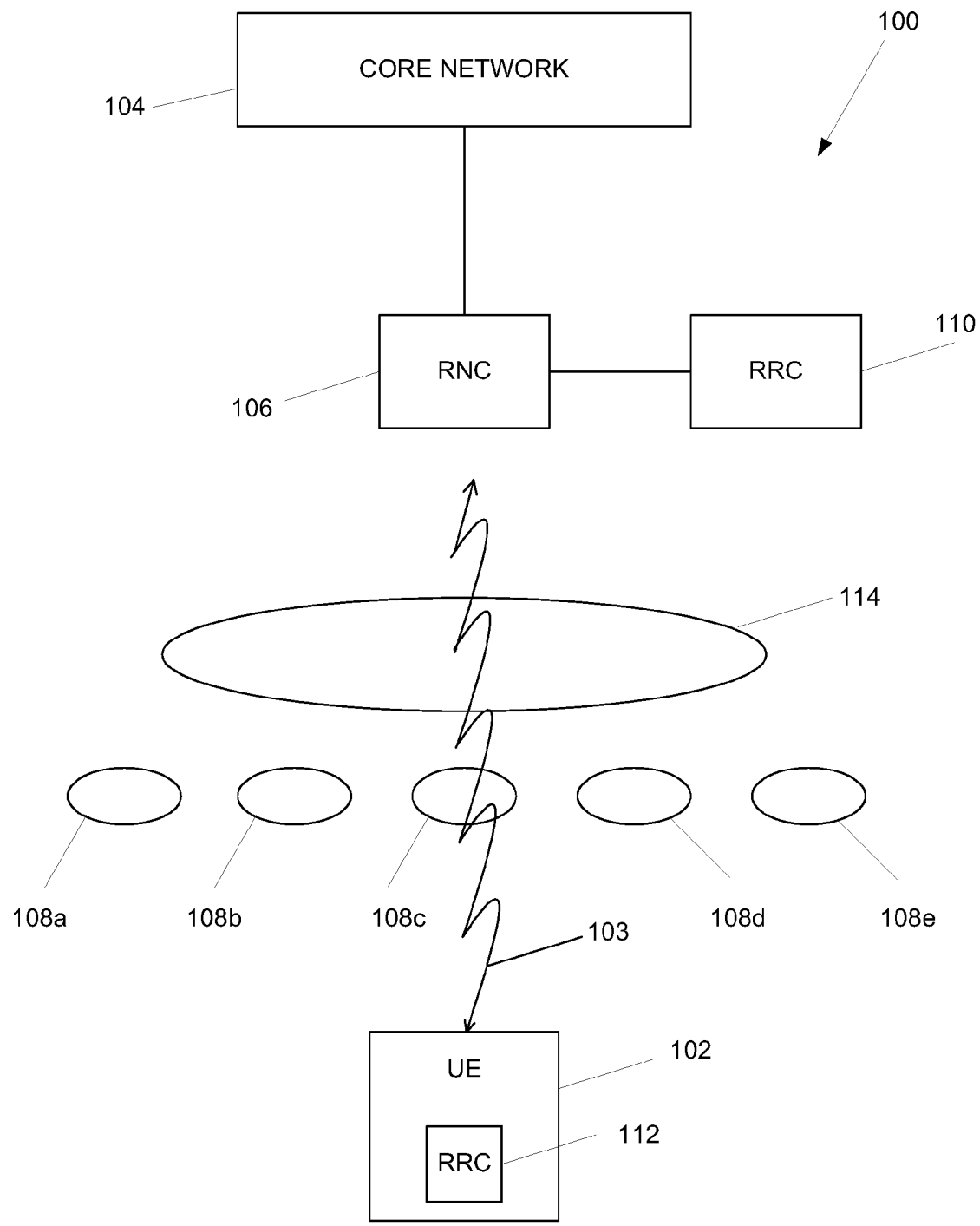
FIG. 1 is a block schematic diagram of a UTRAN system architecture.

Referring to FIG. 1, a UTRAN 100 connects a User Equipment (UE) 102 over a wireless interface 103 to a core network 104 which provides services to subscribers (users of UEs). The UE 102 may comprise a mobile wireless device as will be familiar to a skilled artisan. The UE 102 is connected to the core network 104 through a Radio Network Controller (RNC) 106 which controls a plurality of cells 108a-e within which the UE 102 can operate as it moves within respective geographical areas of said cells 108a-e. The UTRAN 100 comprises a number of RNCs 106 although only one is shown in the figure for reasons of convenience.

Each of the RNC 106 and the UE 102 has a respective Radio Resource Controller 110, 112 associated therewith. The RNC RRC 110 provides various functions including establishment, maintenance and release of radio access resources for UEs 102 within the cells controlled by the RNC RRC 110 and may include an information broadcast function for all such UEs 102. The UE RRC 112 co-operates with the RNC RRC 110 to establish, maintain and release radio access resources allocated to its UE 102.

Each cell 108a-e comprises a respective geographical area in which radio coverage is provided by a respective base station commonly referred to as a Node B (not shown) located within said cell. The Node B's are controlled by their respective RNCs 110.

In the UTRAN 100, cells 108a-e can be grouped to provide what might be considered a higher level cell or geographical coverage. A UTRAN Registration Area (URA) 11 may comprise one or more of cells 108a-e controlled by an RNC 110 or a number of cells from different RNCs, although the URA 114 as illustrated in FIG. 1 is shown as comprising cells 108b-d for reasons of convenience. There can be many URAs although only one is illustrated.

Figure 2:
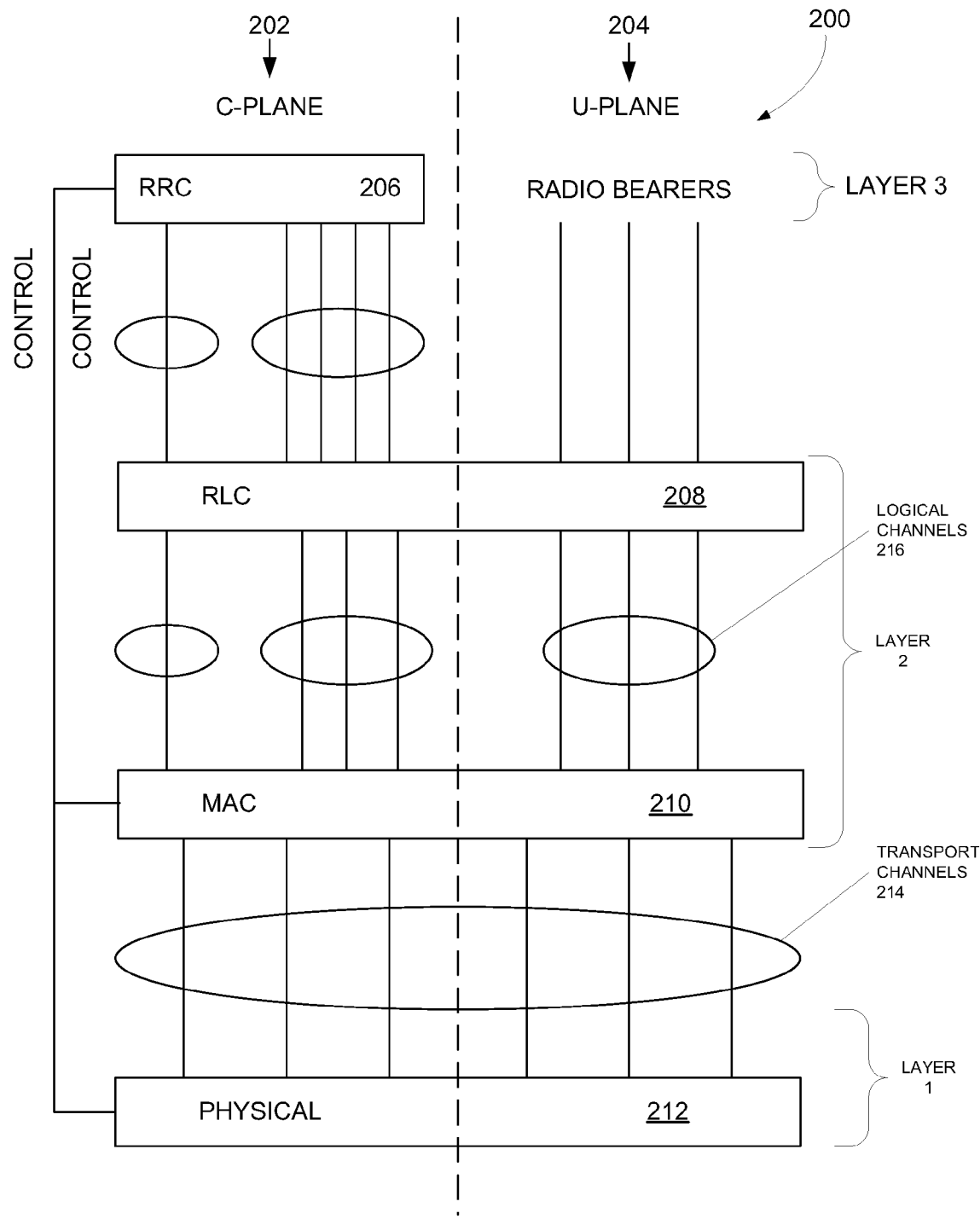
FIG. 2 is a block schematic diagram illustrating a radio interface protocol architecture for the air interface between a UE and the UTRAN.

Referring now to FIG. 2, shown is a 3GPP radio interface protocol architecture 200 for the air interface 103 between the UE 102 and the RNC 106. The protocol architecture 200 comprises a control plane (C-plane) 202 and a user plane (U-plane) 204. The C-plane 202 is used for signalling and the U-plane 204 for transmission of user information. The C-plane 202 includes a RRC layer 206 at Layer 3 of the protocol architecture, a Radio Link Control (RLC) layer 208 and a Medium Access Control (MAC) layer 210 at Layer 2 and a physical layer 212 at Layer 1 thereof. The U-plane 204 shares the RLC layer 208 and the MAC layer 210 at Layer 2.

The physical layer 212 provides the MAC layer 210 with transport channels 214 whilst the MAC layer 210 provides the RLC layer 208 with logical channels 216. Logical control channels are provided when information for the C-plane 202 is to be transported and traffic channels are provided when user information on the U-plane 204 is to be transported. The MAC layer 210 also provides a radio resource reconfiguration service when the RNC RRC 110 requests a radio resource reconfiguration or a MAC parameter change.

The RLC layer 208 provides radio access establishment and release services. The RNC RRC 110 controls the Layer 3 signal processing between the RNC 104 and the UE 102 to establish, maintain and release radio access resources (radio bearers) between the UE 102 and UTRAN 100.

The air interface protocol layers as aforedescribed provide many other services and perform many other functions as will be familiar to a skilled artisan and as described in the 3GPP specifications relating to the air interface architecture protocol stack.

Figure 3:
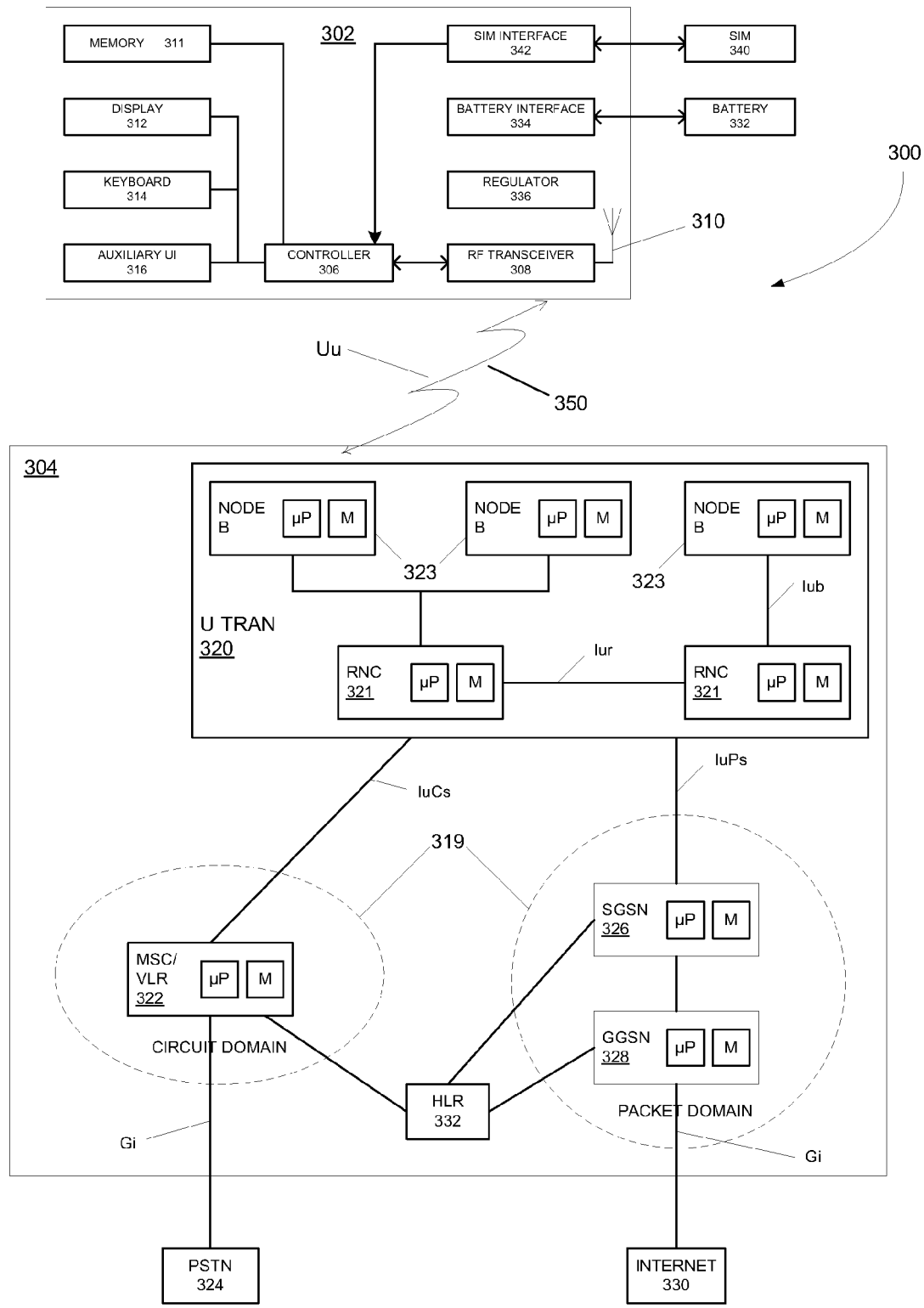
FIG. 3 is a block schematic diagram which illustrates components of the UE and the UMTS network.

FIG. 3 is a block diagram of a communication system 300, which includes a UE 302 that communicates through a wireless communication network 304. UE 302 preferably includes a visual display 312, a keyboard 314, and perhaps one or more auxiliary user interfaces (UI) 316, each of which is coupled to a controller 306. Controller 306 is also coupled to radio frequency (RF) transceiver circuitry 308 and an antenna 310.

Typically, controller 306 is embodied as a central processing unit (CPU), which runs operating system software in a memory component 311. Controller 306 will normally control overall operation of UE 302, whereas signal processing operations associated with communication functions are typically performed in RF transceiver circuitry 308. Controller 306 interfaces with UE display 312 to display received information, stored information, user inputs, and the like. Keyboard 314, which may be a telephone type keypad or full alphanumeric keyboard, is normally provided for entering data for storage in UE 302, information for transmission to network 304, a telephone number to place a telephone call, commands to be executed on mobile device 302, and possibly other or different user inputs.

UE 302 sends communication signals to and receives communication signals from network 304 over a wireless link (air interface) 350 via antenna 310. RF transceiver circuitry 308 performs functions such as modulation/demodulation and possibly encoding/decoding and encryption/decryption.

UE 302 includes a battery interface 334 for receiving one or more rechargeable batteries 332. Battery 332 provides electrical power to electrical circuitry in UE 302, and battery interface 332 provides for a mechanical and electrical connection for battery 332. Battery interface 332 is coupled to a regulator 336, which regulates power to the device. When UE 302 is fully operational, an RF transmitter of RF transceiver circuitry 308 is typically keyed or turned on only when it is sending to a network, and is otherwise turned off to conserve resources. Similarly, an RF receiver of RF transceiver circuitry 308 is typically periodically turned off to conserve power until it is needed to receive signals or information (if at all) during designated time periods.

UE 302 operates using a Subscriber Identity Module (SIM) 340 which is connected to or inserted in UE 302 at a SIM interface 342. SIM 340 is one type of a conventional "smart card" used to identify an end user (or subscriber) of UE 302 and to personalize the device, among other things. Without SIM 340, the UE terminal is not fully operational for communication through wireless network 304. By inserting SIM 340 into UE 302, an end user can have access to any and all of his/her subscribed services. SIM 340 generally includes a processor and memory for storing information. Since SIM 340 is coupled to SIM interface 342, it is coupled to controller 306 through communication lines 344. In order to identify the subscriber, SIM 340 contains some user parameters such as an International Mobile Subscriber Identity (IMSI). An advantage of using SIM 340 is that end users are not necessarily bound by any single physical mobile device (UE). SIM 340 may store additional user information for the mobile device as well, including datebook (or calendar) information and recent call information.

UE 302 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, UE 302 may be a multiple-module unit comprising a plurality of separate components, including but in no way limited to a computer or other device connected to a wireless modem. In particular, for example, in the mobile device block diagram of FIG. 3, RF transceiver circuitry 308 and antenna 310 may be implemented as a radio modem unit that may be inserted into a port on a laptop computer. In this case, the laptop computer would include display 312, keyboard 314, one or more auxiliary UIs 316, and controller 306 embodied as the computer's CPU. It is also contemplated that a computer or other equipment not normally capable of wireless communication may be adapted to connect to and effectively assume control of RF transceiver circuitry 308 and antenna 310 of a single-unit device such as one of those described above.

UE 302 communicates in and through wireless communication network 304. In the embodiment of FIG. 3, wireless network 304 comprises a UMTS network. The UMTS network 304 comprises a UTRAN 320 and a core network 319 comprising a Mobile Switching Center (MSC) 322 (which may include a Visitor Location Register for roaming UEs), a Home Location Register (HLR) 332, a Serving General Packet Radio Service (GPRS) Support Node (SGSN) 326, and a Gateway GPRS Support Node (GGSN) 328. MSC 322 is coupled to UTRAN 320 and to a landline network, such as a Public Switched Telephone Network (PSTN) 324. SGSN 326 is coupled to UTRAN 320 and to GGSN 328, which is in turn coupled to a public or private data network 330 (such as the Internet). HLR 332 is coupled to MSC 322, SGSN 326, and GGSN 328. Each of the devices and systems comprising the UTRAN 320 and the core network has a memory (M) and a micro-processor (μP) for respectively storing and executing software code to implement their specified processes and, where appropriate, the improved data discard process in accordance with the invention.

UTRAN 320 comprises a number of Radio Network Controllers (RNCs) 321 which each serve respective Node Bs 323, in a manner familiar to the skilled artisan. Also shown in FIG. 3 are the designations of the interfaces between the various components of the wireless access network 304 using the recognized designations from the GPRS and UMTS specifications.

Node Bs 323 of UTRAN 320 provide wireless network coverage for UEs 302 within their respective cells under control of their respective RNCs 321 in accordance with UMTS protocols and parameters.

The wireless link 350 of FIG. 3 represents one or more different channels, typically radio bearer or logical channels, between UEs 302 and UTRAN 320.

Those skilled in the art will appreciate that a wireless network 304 in actual practice may include hundreds of cells, each served by a Node B 323, depending upon desired overall expanse of network coverage. All pertinent components may be connected by multiple switches and routers (not shown), controlled by multiple network controllers.

For all UEs 302 registered with a network operator, permanent data (such as UE 302 user's profile) as well as temporary data (such as UE's 102 current location) are stored in HLR 332. In case of a voice call to UE 302, HLR 332 is queried to determine the current location of UE 302. The VLR of MSC 322 is responsible for a group of location areas and stores the data of those UEs that are currently in its area of responsibility. This includes parts of the permanent UE data that have been transmitted from HLR 332 to the VLR for faster access. However, the VLR of MSC 322 may also assign and store local data, such as temporary identifications. Optionally, the VLR of MSC 322 can be enhanced for more efficient co-ordination of GPRS and non-GPRS services and functionality (e.g. paging for circuit-switched calls which can be performed more efficiently via SGSN 326, and combined GPRS and non-GPRS location updates).

Serving GPRS Support Node (SGSN) 326 is at the same hierarchical level as MSC 322 and keeps track of the individual locations of UEs. SGSN 326 also performs security functions and access control. Gateway GPRS Support Node (GGSN) 328 provides interworking with external packet-switched networks and is connected with SGSNs (such as SGSN 326) via an IP-based GPRS backbone network. SGSN 326 performs authentication and cipher setting procedures based on the same algorithms, keys, and criteria as in existing GSM and UMTS as appropriate. In conventional operation, cell selection may be performed autonomously by UE 302 or the RNC 321 responsible for the device 302 instructing it to select a particular cell. UE 302 informs wireless network 304 when it reselects another cell or group of cells, known as a routing area.

In order to access GPRS services, UE 302 first makes its presence known to wireless network 304 by performing what is known as a GPRS "attach". This operation establishes a logical link between UE 302 and SGSN 326 and makes UE 302 available to receive, for example, pages via SGSN, notifications of incoming data, or SMS messages over GPRS. In order to send and receive data, UE 302 assists in activating the packet data address that it wants to use. This operation makes UE 302 known to GGSN 328 such that interworking with external data networks can thereafter commence. User data may be transferred transparently between UE 302 and the external data networks using, for example, encapsulation and tunneling. Data packets are equipped with GPRS-specific protocol information and transferred between UE 302 and GGSN 328 via UTRAN 320.

Those skilled in the art will appreciate that a wireless network may be connected to other systems, possibly including other networks, not explicitly shown in FIG. 3. A network will normally be transmitting at the very least some sort of paging and system information on an ongoing basis, even if there is no actual packet data exchanged. Although the network consists of many parts, these parts all work together to result in certain behaviours at the wireless link.

Figure 4:
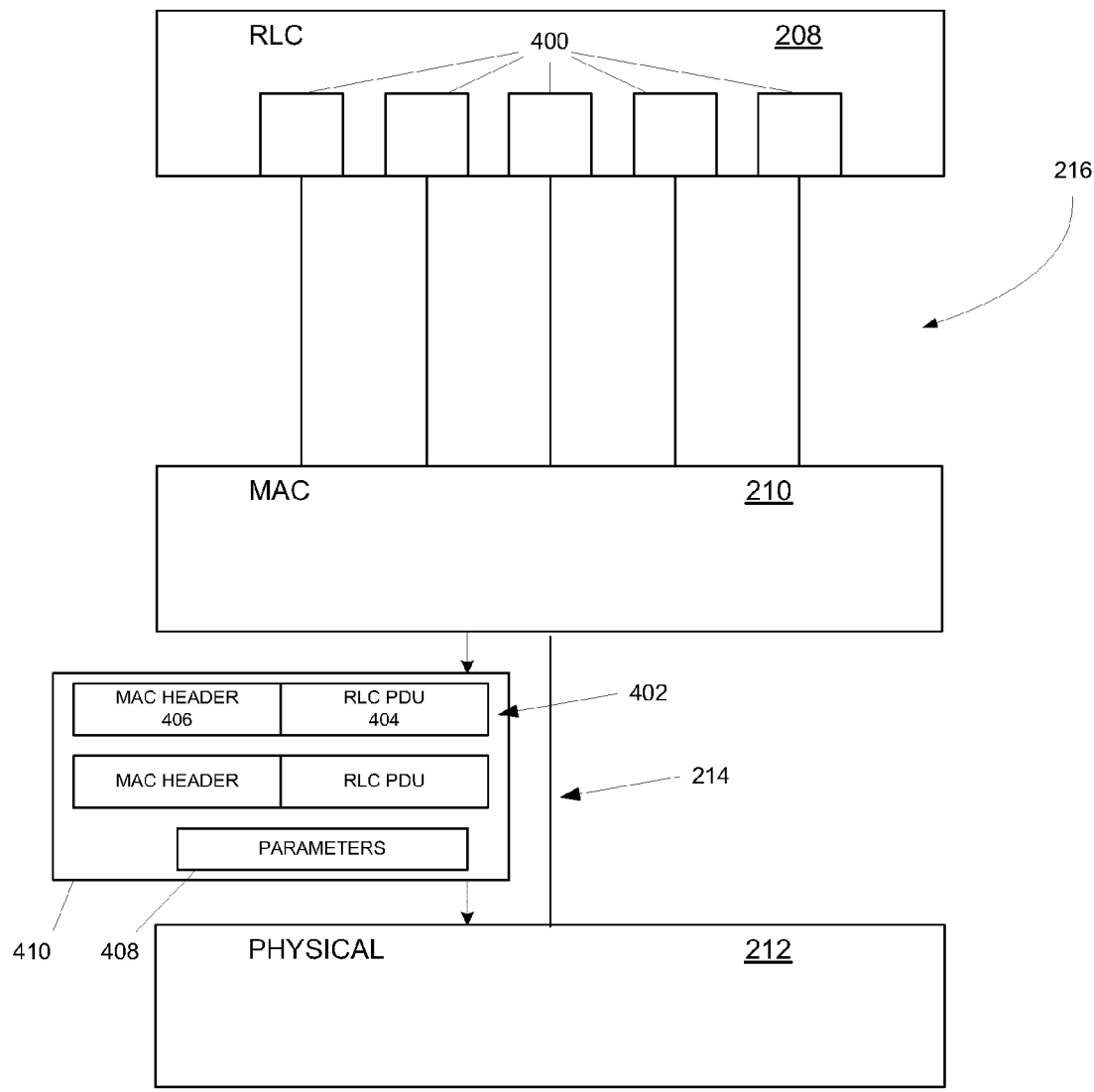
FIG. 4 is a is a block schematic diagram illustrating a part of the radio interface protocol architecture of FIG. 2.

Referring now to FIG. 2 and also to FIG. 4, in the MAC layer 210, multiple logical channels 216 from RLC entities 400 can be multiplexed to a single transport channel 214. The transport channel 214 defines the way traffic from said logical channels 216 is sent to the physical layer 212 for transmission on the air interface 103, 350 between the node B 323 and UE 102, 302. The basic data unit exchanged between the MAC layer 210 and the physical layer 212 is called a Transport Block (TB) 402. It comprises one or more RLC PDUs 404 with a MAC header 406.

A set of TBs 402 and associated parameters 408 exchanged between the MAC layer 210 and the physical layer 212 during a TTI using the same transport channel 214 is called a Transport Block Set (TBS) 410. Attributes of a TBS 410 such as TB size, TBS size, type/rate of coding and duration of TTI for a specific transport channel comprise a Transport Format (TF). A transport channel 214 can support different instantaneous bit rates, each of which has an associated TF.

For each transport channel 214 at each TTI, the MAC layer 210 will choose an appropriate TF. Normally, there will be a plurality of transport channels 214 and so the combinations of TFs for said channels 214 comprises a Transport Format Combination (TFC) which is identified by a TFC Indicator (TFCI). A set of all TFCs permitted by the network 100, 304 comprises a TFC Set (TFCS). The network 100, 304 provides to the UE 102, 302 the TFCS to be used by the UE on an uplink part of the air interface 103, 350.

TFC selection is performed at the MAC layer in both the RNC 106, 321 and the UE 102, 302. In each case, the RNC and UE MAC layers will choose an appropriate TFC for every TTI based on the status of logical channels 216 and the provided radio resources of the transport channels 214.

Figure 5:
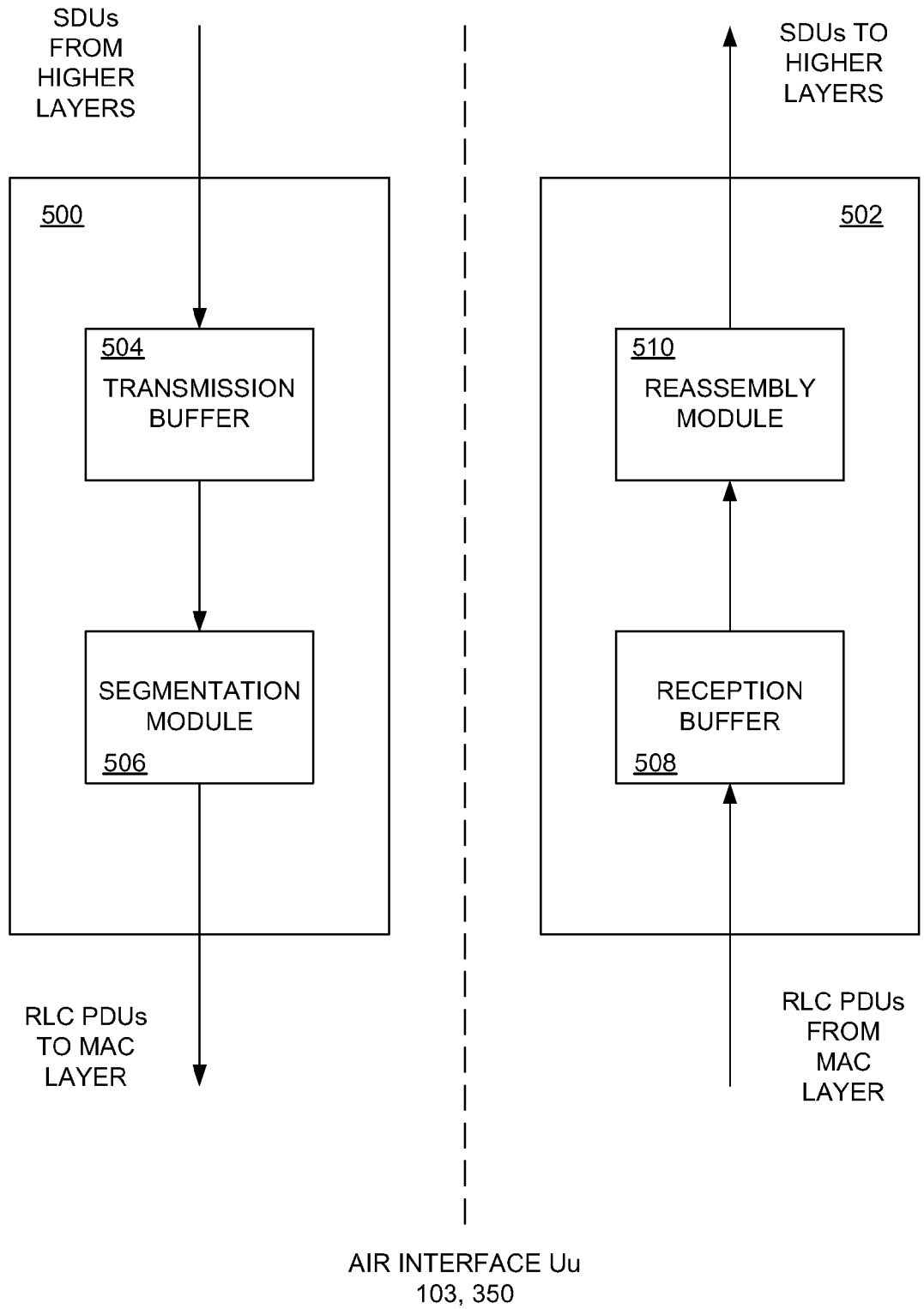
FIG. 5 is a block schematic diagram illustrating the RLC entities for TM transmission.

Each logical channel 216 is managed by a RLC entity 400 on each side of the air interface 103, 350. In the case of TM transmission, each TM RLC channel, as illustrated in FIG. 5, embodied in each of the RNC 106, 321 and UE 102, 302 may comprise a transmitting TM entity 500 and a receiving TM entity 502. The transmitting TM entity 500 comprises a transmission buffer 504 which may be embodied as a Random Access Memory (RAM) or the like in each of the RNC 106, 321 and UE 102, 302 and a segmentation module 506 which may be embodied as a processor executing suitable software in each of said RNC and UE. The receiving entity 502 comprises a reception buffer 508 which may be embodied as a RAM and a reassembly module 510 which may be embodied as a processor. For each of the RNC and UE, the RAM and processor embodying their respective reception buffers 508 and the reassembly modules 510 may comprise the same RAM and processor used to implement the transmission buffer 504 and the segmentation module 504.

SDUs from higher layers are received at the RLC layer 208 and buffered in the transmission buffers 504 of the transmitting entities 500. If segmentation is not configured then such RLC SDUs are transferred as RLC PDUs to the MAC layer 210. However, if segmentation is configured, then oversized RLC SDUs are segmented into smaller RLC PDUs prior to being transferred. The RLC PDUs are transferred by the RLC entities 400 without the addition of headers. The receiving entities 502 reassemble the RLC SDUs from the RLC PDUs received over the air interface 103, 350 and buffered in the reception buffers 508 of the receiving TM entities 502. RLC entities 400 operating TM transmission may be configured to operate SDU discard whereby SDUs received in the RLC TM transmitting entities 500 that are not transmitted within a predetermined period of time are discarded from the transmission buffers 504.

Accordingly, each such RLC TM transmitting entity 500 starts a timer known as Timer_Discard for each SDU received from upper layers, schedules the RLC SDUs that have been received from upper layers for transmission and notifies the MAC layer 210 of reception of data from the upper layers. If one or more RLC SDUs have been scheduled for transmission, the transmitting entity 500 informs the MAC layer 210 of the number and size of SDUs available for transmission and, when requested, submits to the MAC layer a requested number of TM RLC PDUs or an SDU. RLC SDUs that are not submitted to the MAC layer 210 are buffered in the transmission buffer 504.

Upon expiry of the timer Timer_Discard in the transmitting entity 500, the transmitting entity 500 will discard the timed out RLC SDU from the transmission buffer 504. However, in accordance with the existing 3GPP specifications, in the case where the TFC selection process in the MAC layer 210 has been initiated, the RLC layer is required to wait until after it has transferred the requested RLC PDUs to the MAC layer 210 before discarding timed out RLC SDUs. Therefore, the RLC layer 208 effectively suspends the intended data discard operation until it receives a request from the MAC layer 210 for RLC PDUs indicating that the MAC layer 210 has completed the TFC selection process for the corresponding TTI. The RLC layer 208 may delay discarding the timed out RLC SDUs until the end of a next TTI.

The MAC layer 210 does not provide any indication to the RLC layer 208 of when it has started a TFC selection process for a TTI or when the TTI has commenced. The RLC layer 208 will only receive an indication that the MAC layer 210 has completed a TFC selection process for a TTI when the RLC layer 204 receives from the MAC layer 210 a request for RLC PDUs. Consequently, where the MAC layer 210 does not issue a request for data from the RLC layer 208 for one or more consecutive TTIs, the RLC layer 208 must await such an indication for a subsequent TTI in which the MAC layer 210 does then issue a request for data before completing the suspended data discard operation.

The present invention in a first aspect provides an improved method of processing traffic data in Layer 2 whereby the MAC layer 210 is arranged, after receipt of a traffic data volume report from the RLC layer 208, to process said data volume report and to then issue an acknowledgement message to the RLC layer 208 indicating that the MAC layer has received and processed that data volume report. This improved method ensures that the RLC and MAC layers are synchronised with respect to traffic data processing whereby each is using the same data volume report in contrast to the conventional method whereby the MAC layer receives data volume reports from the RLC layer, processes them but issues no acknowledgement messages to the RLC layer in respect of such processing. Thus, in the conventional arrangement, the RLC layer asynchronously transmits a series of traffic data volume reports to the MAC layer as and when the data volume changes but receives no indication from the MAC layer of which of the series of such reports it is using for processing traffic data. The MAC layer may be arranged to issue an acknowledgement to the RLC layer only where it determines from processing a data volume report that the RLC layer is not permitted to transmit data in a next or subsequent corresponding TTI. Where the MAC layer determines from processing a data volume report that the RLC layer is permitted to transmit data, it may be arranged to operate in a conventional manner whereby it does not issue any acknowledgement to the RLC layer that it has received and/or processed said data volume report. In a second aspect, the present invention provides an improved data discard process whereby the MAC layer 210 is arranged, after receipt of a reduced data volume report from the RLC layer 208, to indicate to the RLC layer 208 whether data from the RLC layer 208 is required or not for a next or subsequent TTI. The indication that data is not required may comprise the acknowledgement from the MAC layer that it has processed the reduced data volume report. It may also comprise an indication that a new TTI has started. Where the MAC layer 210 is currently performing a TFC selection process when a reduced data volume report is received, the indication that data is not required is provided after the TFC selection process is completed. Where, after receiving the reduced data volume report, the MAC layer determines that data is required from the RLC layer for a next or subsequent TTI, the MAC layer may be arranged to issue no acknowledgement to the RLC layer on completion of processing the received reduced data volume report thereby causing the RLC layer to operate in a conventional manner. The improved data discard process of the invention need only be invoked where the MAC layer determines from processing a data volume report from the RLC layer that data is not required from the RLC layer for the next or a specified subsequent TTI and issuing an acknowledgement in respect of processing this report. The improved data discard process of the invention can better be understood with reference to FIG. 6 which illustrates, by way of example only, messages exchanged between the RLC and MAC layers with respect to successive TTIs.

During a first TTI 600, designated as "TTI0" for convenience, as upper layer SDUs (data) are being received at the RLC layer 208, the RLC layer 208 sends a data volume report 601 to the MAC layer 210 when the data volume in the TM RLC transmission entity transmission buffers 504 changes. The data volume report may consist of the number of bytes (or bits) available for transmission from that RLC entity. The data volume report may also contain PDU sizes as TFC selection may differ depending on say whether two 20 byte PDUs are available rather than one 40 byte PDU. Several such reports may be issued by the RLC layer during a TTI.

Figure 6:
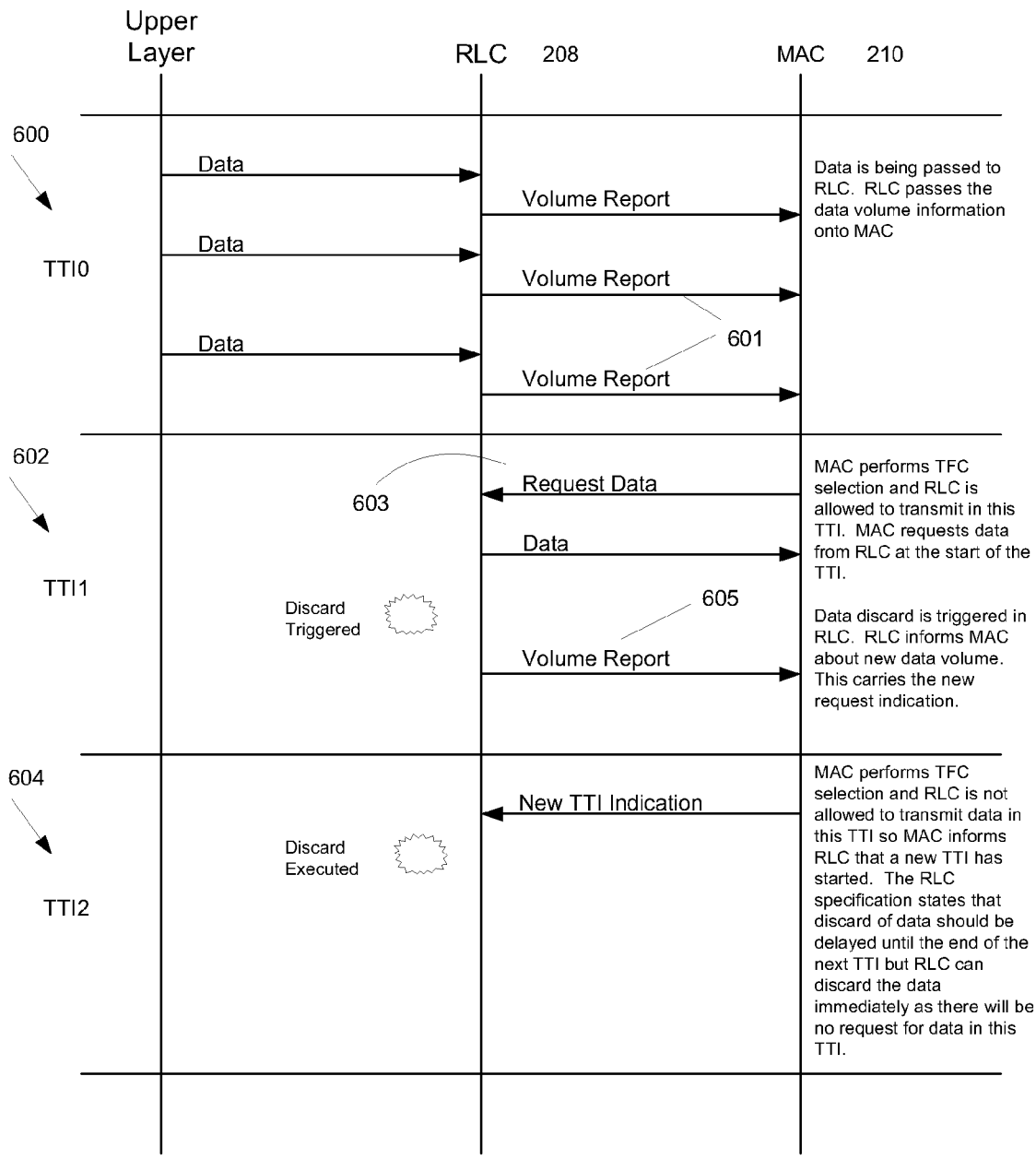
FIG. 6 illustrates messages exchanged between the RLC and MAC layers with respect to successive transmission time intervals (TTIs) in accordance with the data discard process of the present invention.

The physical layer 212 is arranged to inform the MAC layer 210 each time it is ready to receive data for a new TTI. The MAC layer 210 executes a TFC selection for this TTI and, if the RLC layer 208 is permitted to transmit data, the MAC layer 210 will issue a request 603 to the RLC layer 208 for such data, as illustrated in a second TTI 602, designated as "TTI1" in FIG. 6. The RLC layer 208 responds to the MAC request by transmitting the requested RLC PDUs to the MAC layer. Whilst the execution of the TFC selection process and the provision of data by the RLC layer are illustrated in FIG. 6 as occurring at the start of TTI1 (602) and a next TTI 604 designated as "TTI2", it will be appreciated that, in practice, the MAC layer starts a TFC selection process for a corresponding TTI and issues a request for data in advance of the start of said corresponding TTI and the RLC layer also provides the requested data in advance of the start of said TTI. This is necessary to ensure that data requested by the MAC layer is delivered to the physical layer in time for transmission in said corresponding TTI. The TFC selection process and data provision steps may be performed a number of radio frames in advance of said TTI which may comprises one or more TTIs.

When the RLC layer 208 is triggered to discard data through timing out of a RLC SDU, for example, the RLC layer 208 passes a further (reduced) data volume report 605 to the MAC layer 210. This may include an indication to the MAC layer 210 that the RLC layer 208 is to be informed whether data is required or not in a next or subsequent corresponding TTI. The indication that data is not required may comprise an acknowledgement that MAC has completed processing of this data volume report (and determined that the RLC is not permitted to transmit data for a specified TTI) or an indication of when the next TTI starts. The further reduced data volume report consists of the new amount of data available for transmission and may include a flag to indicate that the RLC needs to know whether data is required or not. The new data volume will not include the bytes for the RLC SDU which is to be discarded, i.e. the data volume will have decreased. The MAC layer 210 may use the flag the next time it starts a TFC selection process. As illustrated in FIG. 6, the RLC layer will delay performing the triggered data discard operation until after an indication that MAC does not require data has been received in TT12 (604).

If in TT12 the RLC layer is permitted to transmit data then the MAC layer may be arranged not to issue an acknowledgement to the RLC layer that it has processed the reduced data volume report thereby causing the RLC layer to behave in a conventional manner. This has no negative impact on traffic data processing since the RLC layer is permitted to transmit data on this occasion. If, on the other hand as illustrated in the figure, in TTI2 the RLC layer is not permitted to transmit data, then in the conventional arrangement the MAC layer would not issue a request for data to the RLC layer resulting in the RLC layer being unaware that the next TTI 604 has started thereby delaying the data discard operation until at least the occurrence of a subsequent TTI in which the RLC layer is permitted to transmit data and thus receives a request for data from the MAC layer. However, in accordance with the present invention as illustrated by way of example only in FIG. 6, where the RLC layer is not permitted to transmit data in a next or subsequent corresponding TTI 604, the MAC layer responds to the reduced volume report issued by the RLC layer after data discard was triggered by informing the RLC layer, after its next TFC selection process for the next or a subsequent TTI 604, whether data from the RLC layer is required for this TTI 604. In this example where the RLC is not permitted to transmit data, the MAC layer informs the RLC layer that data is not required for this TTI 604. The data not required indication comprises, in this example, an indication that the TTI 604 has started, but it may comprise any indication that results in the RLC layer determining that data is not required for that TTI. The RLC layer is arranged to then perform the data discard operation at least before the end of that TTI 604 and preferably immediately upon being informed of the start of that TTI 604. The RLC layer is able to immediately discard the data to be discarded since it knows that the MAC layer will not request any RLC PDUs for that TTI 604. Consequently, the delay in discarding data is significantly reduced and also the problem of RLC data discard being effectively suspended for a series of consecutive TTIs is obviated.

In the case where the MAC layer 210 receives the reduced data volume report 605 from the RLC layer 208 between TFC selection processes, the MAC layer 210 may be arranged to respond immediately to the flag contained in the reduced data volume report rather than after a next TFC selection to indicate to the RLC layer 208 that data is not required for the next or a subsequent TTI. The RLC layer can then immediately perform the data discard operation in that same TTI.

Figure 7:
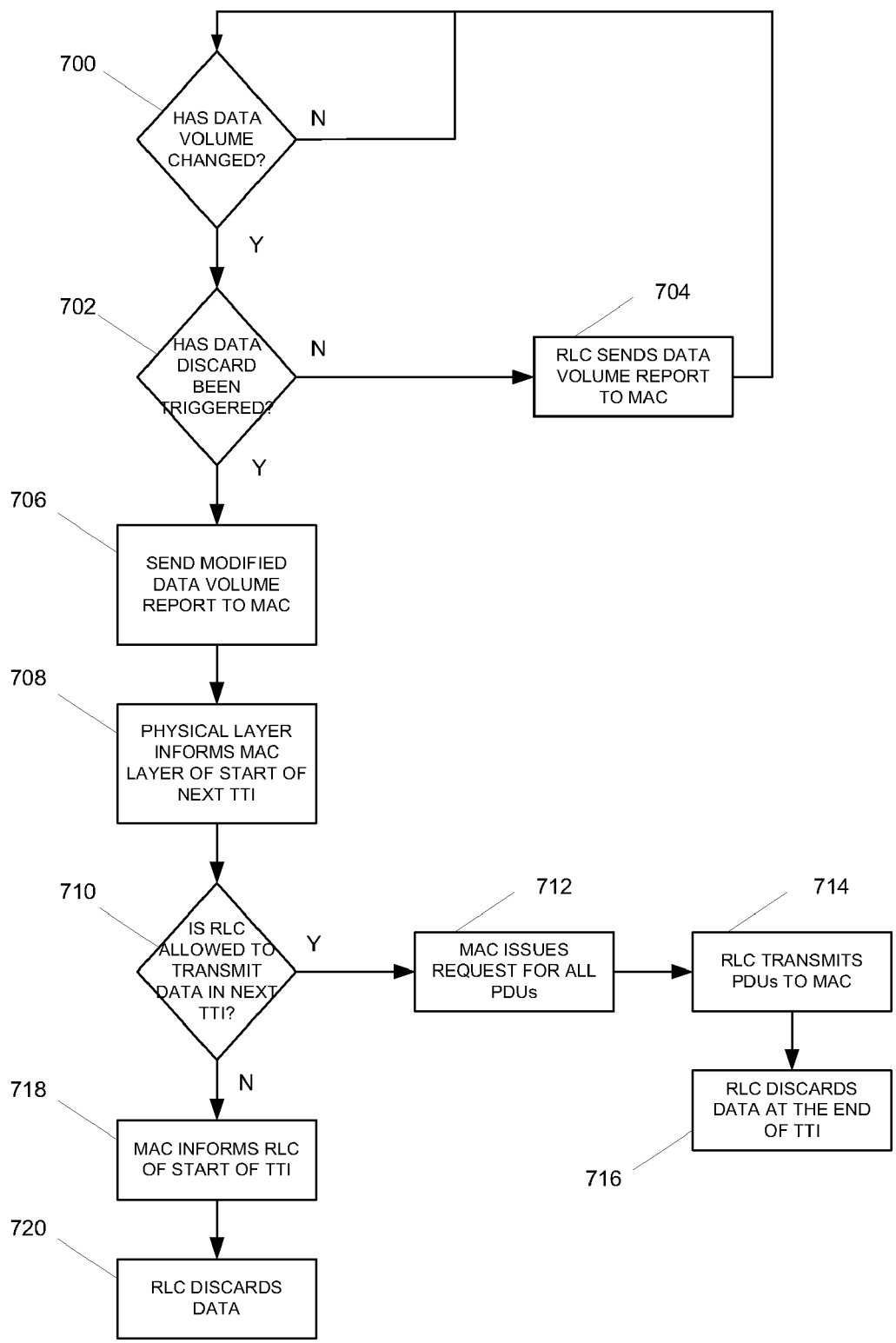
FIG. 7 is a flow diagram illustrating the steps of the data discard process of the present invention.

Referring now to FIG. 7, shown is a flow diagram representative of the improved data discard process in accordance with the invention.

In a first step 700, a determination is made as to whether data volumes in the RLC transmission entity transmission buffers 504 have changed. The determination step may be triggered by the arrival of upper layer SDUs at the RLC layer 208 or by the triggering of a data discard operation.

If it is determined that the data volume of a transmission entity transmission buffer 504 has changed, then in a next step 702 a determination is made as to whether a data discard operation has been triggered by timing out of a buffered SDU, for example. In the case where it is determined that a data discard operation has not been triggered, the method comprises, as a next step 704, sending a data volume report from the RLC layer to the MAC layer. The method then returns to step 700.

However, if it is determined at step 702 that a data discard has been triggered then, as a next step 706, a modified (reduced) data volume report is sent to the MAC layer. The modified data volume report contains a request (flag) from the RLC layer to the MAC layer to inform it whether data will be required or not from the RLC for a next or a subsequent corresponding TTI, the MAC layer being arranged to inform the RLC of whether data is required or not after it has completed a next TFC selection process for that TTI. In the following description of the process illustrated by FIG. 7, it will be assumed that an indication that data is not required comprises an indication of the start of the next TTI.

In a next step 708, the physical layer provides the MAC layer with transmission power information which is used by the MAC layer when performing a TFC selection process for the next or subsequent corresponding TTI. In a next step 710, the MAC layer determines whether the RLC layer is permitted to transmit data in that TTI. In the case that the determination is true, i.e. that the RLC layer is permitted to transmit data, the MAC layer issues a request (step 712) to the RLC layer for RLC PDUs. The RLC layer transmits (step 714) the requested PDUs to the MAC layer and discards (step 716) the data at the end of that TTI.

However, where it is determined at step 708 that the RLC layer is not permitted to transmit data, the MAC layer informs (step 718) the RLC layer of commencement of the TTI and the RLC layer performs (step 720) the discard operation before the end of the TTI. Preferably, the RLC layer performs the data discard operation immediately upon being informed of the start of the TTI.

The foregoing description of a RLC transmitting entity and the improved RLC data discard process in accordance with the invention was provided in relation to the RLC operating in TM transmission. It should be noted, however, that in the case of UM transmission, the UM RLC entities (not shown) managing the logical channels 216 perform the same basic operations of buffering, segmentation and reassembly as the TM RLC entities 400. Whilst, the UM RLC entities may also be arranged to perform additional operations such as concatenation, ciphering/deciphering and to add a header to each RLC PDU transferred to the MAC layer 210, the improved process of the present invention is equally applicable to UM transmission. Similarly, in the case of AM transmission, whilst the AM RLC entity (not shown) comprises a single entity having a transmitting side and a receiving side and whilst the arrangement and operations performed by the single AM RLC entity are more complex than either of the TM RLC entities 400 or the UM RLC entities, it still performs the same basic operations of buffering, segmentation and reassembly and thus the improved process of the present invention is equally applicable thereto.

It should also be noted that the improved process of the present invention is not limited to RLC arrangements where data discard is triggered by timing out of a buffered SDU, but is applicable to any mechanism of triggering SDU discard such as failure to transmit an SDU within a predetermined number of transmissions, for example.

In summary, the present invention concerns a method of processing traffic data in Layer 2 of a wireless communications system, whereby the MAC layer is arranged, after receipt of a traffic data volume report from the RLC layer, to process said data volume report and to then issue an acknowledgement message to the RLC layer indicating that the MAC layer has received and processed that data volume report. The method ensures that the RLC and MAC layers are synchronised with respect to traffic data processing whereby each is using the same data volume report in contrast to the conventional method whereby the MAC layer receives data volume reports from the RLC layer, processes them but issues no acknowledgement messages to the RLC layer in respect of such processing. Thus, in the conventional arrangement, the RLC layer asynchronously transmits a series of traffic data volume reports to the MAC layer as and when the data volume changes but receives no indication from the MAC layer of which of the series of such reports it is using for processing traffic data. The MAC layer may be arranged to issue an acknowledgement to the RLC layer only where it determines from processing a data volume report that the RLC layer is not permitted to transmit data in a next or subsequent corresponding TTI. Where the MAC layer determines from processing a data volume report that the RLC layer is permitted to transmit data, it may be arranged to operate in a conventional manner whereby it does not issue any acknowledgement to the RLC layer that it has received and/or processed said data volume report. The present invention also concerns a process for data discard in a Radio Link Control (RLC) layer of a Wideband Code Division Multiple Access (WCDMA) wireless communications system such as a Universal Mobile Telecommunications System (UMTS). The process involves, responsive to the triggering of a data discard operation, determining whether the RLC layer is permitted to transmit data. Where it is determined that the RLC layer is not permitted to transmit data in a next or subsequent TTI, the method includes the steps of informing the RLC layer that data is not required. This may comprise informing the RLC of the start of the next TTI and performing the data discard operation before the end of said next TTI. Preferably, the data discard operation is performed immediately the RLC layer is informed that data is not required for that TTI. The process of the invention reduces the time delay between the triggering of a data discard operation and the performance of said operation. It also mitigates the problem associated with the conventional discard process whereby the discard operation is, in effect, suspended for a series of consecutive TTIs where the RLC layer is not permitted to transmit data.

The invention claimed is:

1. A method of processing traffic data in a medium access control (MAC) layer of a wireless communications system, the method comprising the steps of:
receiving a traffic data volume report at the MAC layer from a radio link control (RLC) layer during a first transmission time interval 'TTI', said traffic data volume report being initiated in response to a data discard event in the RLC layer and informing the MAC layer of a reduced amount of traffic data available for transmission;
determining at the MAC layer if said RLC layer is permitted to transmit the traffic data to the MAC layer in a next transmission time interval (TTI); and
issuing an acknowledgement message to said RLC layer where it is determined that said RLC layer is not permitted to transmit the traffic data to the MAC layer in the next transmission time interval (TTI).

2. The method of claim 1, wherein the MAC layer is arranged to issue the acknowledgement message to the RLC layer only where the MAC layer determines that said RLC layer is not permitted to transmit the traffic data to the MAC layer in the next transmission time interval (TTI).

3. A method of discarding data in a radio link control (RLC) layer of a wireless communications system, comprising the steps of:
triggering at the RLC layer a data discard operation in a first transmission time interval (TTI);
in response to said triggering, sending a traffic data volume report from the RLC layer to a medium access control 'MAC' layer informing the MAC layer of a reduced amount of traffic data available for transmission;
determining at the MAC layer for a next TTI whether the RLC layer is permitted to transmit data; and
where the determination is made that the RLC layer is not permitted to transmit data in the next TTI, the method includes the steps of:
the MAC layer informing the RLC layer that data is not required; and
the RLC layer performing the data discard operation.

4. A method as claimed in claim 3, wherein the RLC layer is informed that data is not required for the next TTI after completion of a current Transport Format Combination (TFC) selection process.

5. A method as claimed in claim 3, wherein the RLC layer is informed that data is not required during a next TTI and the data discard operation is performed before the end of said TTI.

6. A method as claimed in claim 3, wherein the step of informing the RLC layer that data is not required for the next TTI comprises informing the RLC layer of the start of the next TTI.

7. A method as claimed in claim 3, wherein the data discard operation is performed immediately upon the RLC layer being informed that the data is not required.

8. A method as claimed in claim 3, wherein the triggering of the data discard operation in the first TTI causes said RLC layer to issue a request to said MAC layer in said first TTI for the MAC layer to inform the RLC layer whether data is required or not in the next TTI.

9. A method as claimed in claim 8, wherein said request issued by said RLC layer in said first TTI is contained in a said data volume report sent in response to the triggering of a data discard operation.

10. A radio network controller (RNC) for a wireless communications system for processing traffic data in a medium access control (MAC) layer thereof, comprising:
means for receiving a traffic data volume report at the MAC layer from a radio link control (RLC) layer during a first transmission time interval 'TTI', said traffic data volume report being initiated in response to a data discard event in the RLC layer and informing the MAC layer of a reduced amount of traffic data available for transmission;
means for determining at the MAC layer if said RLC layer is permitted to transmit the traffic data to the MAC layer in a next transmission time interval (TTI); and
means for issuing an acknowledgement message to said RLC layer where it is determined that said RLC layer is not permitted to transmit the traffic data to the MAC layer in the next transmission time interval (TTI).

11. The radio network controller of claim 10, wherein the means for issuing is arranged to issue the acknowledgement message to the RLC layer only where the means for determining determines that said RLC layer is not permitted to transmit the traffic data to the MAC layer in the next transmission time interval (TTI).

12. A radio network controller (RNC) for a wireless communications network, comprising:

means for triggering at a Radio Link Control (RLC) layer a data discard operation in a first transmission time interval (TTI);

means for sending a traffic data volume report from the RLC layer to a medium access control 'MAC' layer in response to said triggering to inform the MAC layer of a reduced amount of traffic data available for transmission;

means for determining at the MAC layer for a next TTI whether the RLC layer is permitted to transmit data;

means at the MAC layer responsive to said determining means for informing the RLC layer that the data is not required for that TTI where said determining means determines that the RLC layer is not permitted to transmit the data in the next TTI; and means at the RLC layer for performing the data discard operation.

13. A radio network controller as claimed in claim 12, wherein the means responsive to the determining means informs the RLC layer that the data is not required for the next TTI after completion of a current Transport Format Combination (TFC) selection process.

14. A radio network controller as claimed in claim 12, wherein the means responsive to the determining means informs the RLC layer that the data is not required during the next TTI.

15. A radio network controller as claimed claim 12, wherein the means responsive to the determining means is arranged to inform the RLC layer that the data is not required in the next TTI by way of informing the RLC layer of the start of the next TTI.

16. A radio network controller as claimed in claim 15, wherein the RLC layer is arranged to issue a request to said MAC layer in said first TTI for the MAC layer to inform the RLC layer whether the data is required or not in next TTI in response to the triggering of the data discard operation in the first TTI.

17. A radio network controller as claimed in claim 16, wherein said request issued by said RLC layer in said first TTI is contained in said data volume report sent in response to the triggering of a data discard operation.

18. A radio network controller as claimed in claim 12 wherein said means for performing the data discard operation is arranged to perform said discard operation immediately upon the RLC layer being informed that the data is not required.

19. User equipment (UE) for a wireless communications network for processing traffic data in a medium access control (MAC) layer thereof, comprising:

means for receiving a traffic data volume report at the MAC layer from a radio link control (RLC) layer during a first transmission time interval 'TTI', said traffic data volume report being initiated in response to a data discard event in the RLC layer and informing the MAC layer of a reduced amount of traffic data available for transmission;

means at the MAC layer for determining if said RLC layer is permitted to transmit the traffic data to the MAC layer in a next transmission time interval (TTI); and means for issuing an acknowledgement message to said RLC layer where it is determined that said RLC layer is not permitted to transmit the traffic data to the MAC layer in the next transmission time interval (TTI).

20. User equipment as claimed in claim 19, wherein the means for issuing is arranged to issue the acknowledgement message to the RLC layer only where the means for determining determines that said RLC layer is not permitted to transmit the traffic data to the MAC layer in the next transmission time interval (TTI).

21. User equipment (UE) for a wireless communications network, comprising:

means at the RLC layer for triggering a data discard operation in a first transmission time interval (TTI);

means for sending a traffic data volume report from the RLC layer to a medium access control 'MAC' layer in response to said triggering and to inform the MAC layer of a reduced amount of traffic data available for transmission;

means at the MAC layer for determining for a next TTI whether the RLC layer is permitted to transmit data;

means at the MAC layer responsive to said determining means for informing the RLC layer that the data is not required for that TTI where said determining means determines that the RLC layer is not permitted to transmit the data in the next TTI; and means at the RLC layer for performing the data discard operation.

22. User equipment as claimed in claim 21, wherein the means responsive to the determining means informs the RLC layer that the data is not required for the next TTI after completion of a current Transport Format Combination (TFC) selection process.

23. User equipment as claimed in claim 21, wherein the means responsive to the determining means informs the RLC layer that the data is not required during said next TTI.

24. User equipment as claimed in claim 21, wherein the means responsive to the determining means is arranged to inform the RLC layer that the data is not required by way of informing the RLC layer of the start of said next TTI.

25. User equipment as claimed in claim 24, wherein the RLC layer is arranged to issue a request to said MAC layer in said first TTI for the MAC layer to inform the RLC layer whether the data is required or not for said next TTI in response to the triggering of the data discard operation in the first TTI.

26. User equipment as claimed in claim 25, wherein said request issued by said RLC layer in said first TTI is contained in said data volume report sent in response to the triggering of a data discard operation.

27. User equipment as claimed in claim 21, wherein said means for performing the data discard operation is arranged to perform said discard operation immediately upon the RLC layer being informed that the data is not required.

28. User equipment as claimed in claim 21, wherein said user equipment comprises a mobile communications device.

29. A tangible computer readable medium comprising program code executable on a processor of a radio network controller (RNC) of a wireless communications system to process traffic data in a medium access control (MAC) layer of the wireless communications system, the program code enabling said RNC to:

receive a traffic data volume report from the RLC layer at the MAC layer from a radio link control (RLC) layer during a first transmission time interval 'TTI', said traffic data volume report being initiated in response to a data discard event in the RLC layer and informing the MAC layer of a reduced amount of traffic data available for transmission;

determine at the MAC layer if said RLC layer is permitted to transmit the traffic data to the MAC layer in a next transmission time interval (TTI); and issue an acknowledgement message to said RLC layer where it is determined that said RLC layer is not permitted to transmit the traffic data to the MAC layer in the next transmission time interval (TTI).

30. A tangible computer readable medium comprising program code executable on a processor of a user equipment (UE) a wireless communications system to process traffic data in a medium access control (MAC) layer of the wireless communications system, the program code enabling said UE to:

receive a traffic data volume report from the RLC layer at the MAC layer from a radio link control (RLC) layer during a first transmission time interval 'TTI', said traffic data volume report being initiated in response to a data discard event in the RLC layer and informing the MAC layer of a reduced amount of traffic data available for transmission;

determine at the MAC layer if said RLC layer is permitted to transmit the traffic data to the MAC layer in a next transmission time interval (TTI); and issue an acknowledgement message to said RLC layer where it is determined that said RLC layer is not permitted to transmit the traffic data to the MAC layer in the next transmission time interval (TTI).

* * * * *